United States Patent
Wilkinson et al.

(10) Patent No.: US 7,706,981 B2
(45) Date of Patent: Apr. 27, 2010

(54) METHOD FOR GENERATING RESERVOIR MODELS UTILIZING SYNTHETIC STRATIGRAPHIC COLUMNS

(75) Inventors: David A. Wilkinson, Concord, CA (US); Deyi Xie, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 210 days.

(21) Appl. No.: 11/672,925

(22) Filed: Feb. 8, 2007

(65) Prior Publication Data
US 2008/0195319 A1    Aug. 14, 2008

(51) Int. Cl.
*G01V 1/00* (2006.01)

(52) U.S. Cl. .................................................. 702/14
(58) Field of Classification Search .................... 702/14
See application file for complete search history.

(56) References Cited

U.S. PATENT DOCUMENTS

| | | | |
|---|---|---|---|
| 5,838,634 A * | 11/1998 | Jones et al. | 367/73 |
| 6,246,963 B1 | 6/2001 | Cross et al. | |
| 6,754,588 B2 | 6/2004 | Cross et al. | |
| 6,853,922 B2 * | 2/2005 | Stark | 702/14 |
| 7,379,854 B2 * | 5/2008 | Calvert et al. | 703/10 |
| 7,516,055 B2 * | 4/2009 | Strebelle | 703/10 |
| 7,606,691 B2 * | 10/2009 | Calvert et al. | 703/10 |

OTHER PUBLICATIONS

Paul F. De Groot et al., Monte Carlo Simulation of Wells, Geophysics, May-Jun. 1996, pp. 631-638, vol. 61. Number 3, 1996 Society of Exploration Geophysicists.

* cited by examiner

*Primary Examiner*—Aditya Bhat
(74) *Attorney, Agent, or Firm*—Maurice Teixeira; Torrey A. P. Turner

(57) ABSTRACT

The present invention incorporates the use of geophysical, geological and formation evaluation data to develop synthetic stratigraphic columns based on depositional rules and sedimentary stacking patterns. The present invention utilizes dynamic assignment and matching whereby the synthetic columns can be easily conformed throughout the reservation characterization process as geological data becomes available.

14 Claims, 23 Drawing Sheets

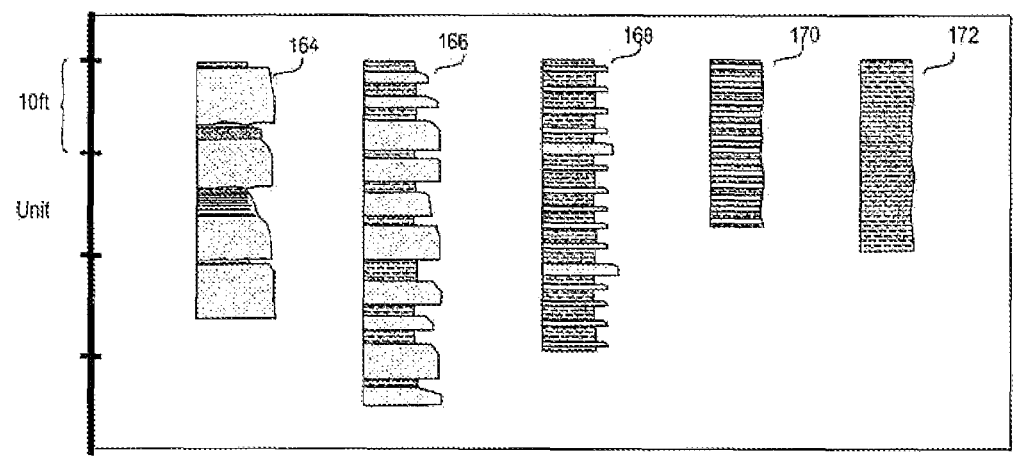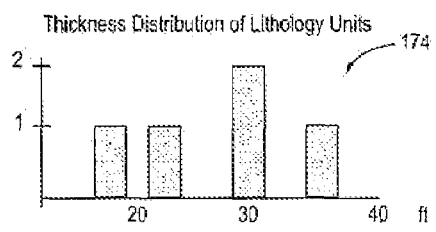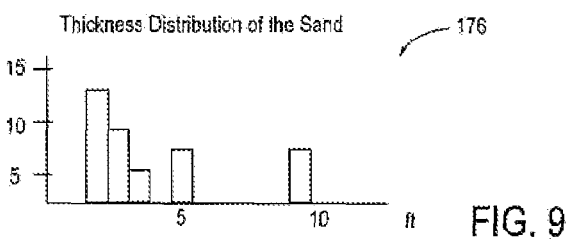
FIG. 9

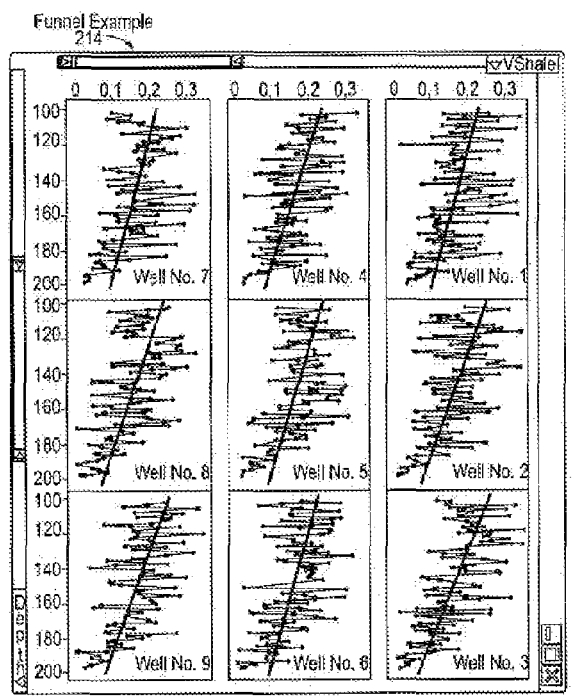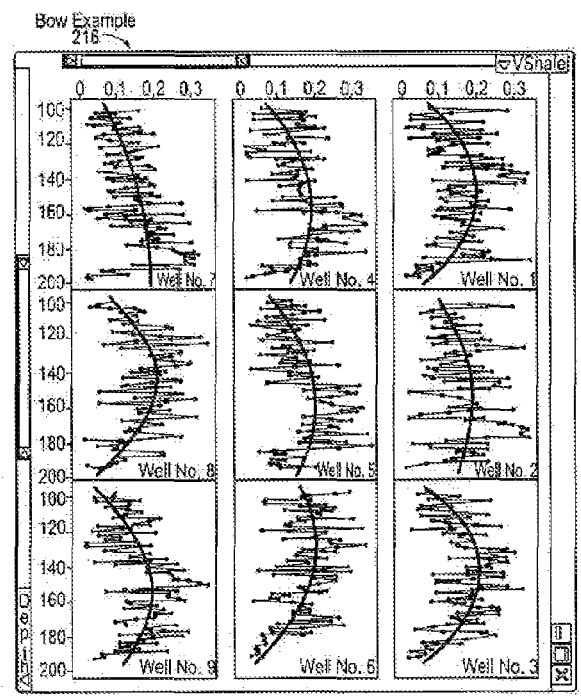
Axis.Sand.Vsh:
Increasing Upwards (Funnel-Shape) FIG. 12A
OffAxis.Sand.Vsh:
Increasing Middlewards (Bow-Shape) FIG. 12B

METHOD FOR GENERATING RESERVOIR MODELS UTILIZING SYNTHETIC STRATIGRAPHIC COLUMNS

BACKGROUND OF THE INVENTION

This invention relates to the three-dimensional geological modeling and the characterization of subsurface reservoirs of interest.

In the on-going search for subsurface hydrocarbons, methods have been developed for evaluating and interpreting the structure and characteristics of the earth's subsurface. Of particular importance is the ascertainment of formation characteristics consistent with the presence of hydrocarbon deposits.

There is an increasing need for reservoir characterization within the oil and gas industry. The need for reservoir characterization is mostly driven by economic realities: if reservoirs can be defined better using available technology then the end result is higher drilling success and fewer development wells. As part of the characterization and development of an oil or gas field, it is often required that a computer model of the subsurface reservoir be built. As the exact characteristics of the earth's subsurface cannot be clearly defined, multiple computer models which are various examples of the possible facies and their associated properties are developed.

Developing accurate reservoir models is a key objective of companies in the oil and gas industry. A properly constrained reservoir model can be used to quantify hydrocarbons in place and to optimize hydrocarbon production. The evaluation of reservoirs is typically achieved using a combination of seismic and well data. Each of these data represents imperfect measurements with a certain level of error. The manner in which these errors are handled affects the integration of the two data types and determines the quality of the final reservoir model.

It is common practice to obtain data about a reservoir from well logging instruments moved through existing wells in the reservoir. Such well data obtained from the well through well logs of various types represent data samples from only a small fraction of a reservoir's volume. For effective evaluation of a reservoir, knowledge of the actual rock formation (lithology or lithofacies) and the contained fluids, as well as the relative presence or volume of pore space (or its porosity), is needed. The fact that a reservoir exhibits certain lithofacies and porosity at a well provide no assurances that other areas of the reservoir have the same characteristics. Geological models of lithofacies and porosity that are based solely on well data thus contain large regions that are not based on actual sampled data; rather, the data must be estimated from the closest existing wells.

Three-dimensional seismic surveys provide data samples over most of a reservoir's volume, including portions unsampled by wells, but at best the seismic data can provide only indirect measurements of lithofacies and porosity. Existing seismic surveying technology does not offer techniques to measure either of these formation characteristics directly.

Geological modeling of the subsurface has been performed for many years by geologists, geophysicists, engineers and hydrologists. Many descriptive or static 3-D geological models built for mining or petroleum applications have been in the form of a specified three-dimensional array of individual model units or blocks (also called cells). One particular prior art methodology used to build reservoir property models has been impedance inversion. In this prior art method, the seismic data is inverted directly using a sparseness constraint for acoustic impedance values. One of the stumbling blocks in that method is the need for a low frequency model to compensate for the fact that the seismic data is bandlimited and therefore does not contain low frequencies. The low frequency model is typically generated from well data, in conjunction with seismic interpretation. One issue is that the low frequency model can be inadequate where there is limited well data available. A further issue is that seismic data also does not contain high frequencies, and with the above-described approach, the sparse reflectivity model which attempts to compensate for the lack of high frequencies can be inconsistent with the actual geological setting for which the inversion is being performed. This leads to poor estimates of the missing high frequency components. In addition, since this process is typically performed on a trace by trace basis no attempt is made to conform to the actual spatial statistics that are consistent with the actual well data.

In an attempt to include spatial statistics in the impedance inversion approach, stochastic inversion methods have been developed. These methods incorporate spatial statistics in the form of spatial variograms derived from available well data. A starting model is generated by interpolating the real well data using the spatial variograms and any existing seismic interpretation. This model is then iteratively updated until a sufficient match between the observed seismic data and the updated model, which obeys the required spatial constraints, is reached. Major drawbacks in this approach are the problems associated with the sparse well situation where the spatial variogram is poorly determined and the difficulty of getting a good match to the seismic when the starting model is poorly defined.

Both of the above-described approaches neglect the advantage offered by utilizing prior knowledge of the possible stratigraphic layering of the sediments over the area of interest. One approach which addresses this issue has been developed by dGB Earth Sciences. That approach utilizes the concept of geologically designed pseudo or synthetic wells to capture the deterministic nature of depositional environments together with probabilistic distributions of lithologies and elastic properties. A paper by de Groot P., Bril A., Florist F. and Campbell A., *Monte Carlo Simulation of Wells*, Geophysics, Vol. 61, No. 3 (May-June 1996); pp. 631-638 describes a methodology where 1-D stratigraphic profiles of pseudo-wells with attached physical properties, but without spatial information, are simulated using a combination of geological knowledge and Monte Carlo statistics. The paper describes the advantages of the described-method as being able to steer the algorithm with rules based on geological reasoning, and that hard constraints for the stochastic variables can be included.

While the methodology described by de Groot and Bril is a step in the right direction, there is a need for an improved method which is more closely constrained by actual depositional geology, has the ability to use dynamic pseudo-wells and which expands the functionality of the method.

SUMMARY OF THE INVENTION

The present invention overcomes the above-described and other shortcomings of the prior art by providing a novel and improved method of estimating reservoir properties, at both the exploration and production scale. The improved method incorporates the use of geophysical, geological and formation evaluation data to develop labeled synthetic stratigraphic columns based on depositional rules, sedimentary stacking patterns and rock physics.

The present invention allows for improved estimates of large scale properties such as Net-to-Gross and detailed properties such as high resolution elastic properties (e.g. velocity, density) and reservoir properties (e.g. porosity, permeability, fault seal uncertainty). The reservoir properties estimated by the present invention will honor geological, stratigraphic and geophysical constraints. The present invention offers the opportunity for initial prospect evaluation as well as detailed well planning and model building.

As used herein, the term "geological" includes geological, geophysical, formation evaluation and stratigraphic data The present invention includes a method of modeling a synthetic stratigraphic column for a reservoir model. The method includes dynamically assigning a plurality of labeled stratigraphic units to the synthetic stratigraphic column based upon pre-selected geological patterns. The method also includes dynamically assigning elastic geological properties to each of the stratigraphic units in the synthetic stratigraphic column. The method further includes sampling the synthetic stratigraphic column to provide an elastic property log and converting the elastic property log to a synthetic seismogram. The method includes dynamically matching the synthetic seismogram to a corresponding seismogram in a set of real seismograms to obtain coordinates for the synthetic stratigraphic column with the reservoir model.

The methodology used by the present invention allows for synthetic stratigraphic columns to be constrained by various types of sedimentary structures, beds and bedding which are determined by geological depositional rules and sedimentary stacking patterns. The present invention also allows for the assignment of elastic geological properties to the stratigraphic units within the stratigraphic columns based on real well statistics, proprietary rock property databases and related stratigraphic patterns.

The present invention utilizes dynamic assignment and matching whereby the labeled synthetic columns can be easily conformed throughout the reservation characterization process as geological data becomes available. As part of the matching process, the present invention enables the simulated well logs to be dynamically updated to conform to interpreted seismic surfaces. Once the vertical constraints have been accounted for then possible horizontal constraints can be considered.

The present invention allows for the construction of 3D reservoir volumes by making choices of available 1D labeled synthetic stratigraphic columns at each spatial location of the 3D reservoir volume. The manner in which those choices are made can be either deterministic in nature or governed by geostatistical constraints, such as Multiple-Point Statistics ("MPS"), and variograms and other spatial constraints, such as Facies Distribution Modeling ("FDM").

The present invention enables the estimation of seismic velocities (Vp and Vs) of compressional (p) and shear (s) waves from lithology, density and real finite-offset seismic data. The present invention also enables the estimation of porosity from Vp, Vs and density for each lithofacies using a Bayesian approach. The present invention further enables the transformation of the elastic geological properties (e.g. Vp, Vs, density and porosity) to reservoir properties (e.g. permeability) via a process based on genetic programming and Fuzzy Neural Nets.

The present invention provides an improved method of estimating reservoir properties. One embodiment of the present invention uses identified or specific stratigraphic depositional patterns (e.g. fining upwards bell shape) for assigning lithology distributions within the stratigraphic units. Another embodiment of the present invention utilizes elastic properties for each stratigraphic unit which can be assigned based on known stratigraphic patterns. Use of large scale depositional phase diagrams (e.g. the Colorado School of Mine's Adjustment-Initiation-Growth-and-Retreat method, cast in terms of nested histograms) to build pseudo-wells in essentially data free environments is made possible by the present invention.

In yet another embodiment of the present invention, an index map (generated from seismic interpretations or pre-set geologic concepts) is used to dynamically match characteristic of pseudo wells to specific locations. For example, if at coordinates x, y, there are subsurface channels A, B, C, the present invention allows for pseudo-wells at those coordinates to have those channelized features present.

In another embodiment, the present invention enables the use of dynamic stretching and squeezing of pseudo-wells to tie pre-existing well markers and horizon pairs.

In a further embodiment of the present invention where multiple pseudo-wells can be generated for a specific location, specific criteria are used to choose a pseudo-well using spatial constraints generated from 3D MPS training images or from low-frequency Net-to-Gross property estimates.

In a further embodiment of the present invention where multiple pseudo-wells can be generated for a specific location, specific criteria are used to choose a pseudo-well using particular deterministic constraints resulting in a combinatorial approach based on genetic algorithm optimization.

The present invention will also allow for Net-to-Gross to be estimated by clustering low-frequency synthetic seismic generated from the pseudo stratigraphic columns, and comparing the synthetic seismic to real seismic data.

It should be appreciated that the present invention is intended to be used with a system which includes, in general, an electronic configuration including at least one processor, at least one memory device for storing program code or other data, a video monitor or other display device (i.e., a liquid crystal display) and at least one input device. The processor is preferably a microprocessor or microcontroller-based platform which is capable of displaying images and processing complex mathematical algorithms. The memory device can include random access memory (RAM) for storing event or other data generated or used during a particular process associated with the present invention. The memory device can also include read only memory (ROM) for storing the program code for the controls and processes of the present invention.

Additional features and advantages of the present invention are described in, and will be apparent from, the following Detailed Description of the Invention and the Figures.

BRIEF DESCRIPTION OF THE DRAWINGS

These and other objects, features and advantages of the present invention will become better understood with regard to the following description, pending claims and accompanying drawings where:

FIG. 9 illustrates an example of a distribution of thicknesses at both the unit and lithology levels;

FIGS. 12A and 12B illustrate examples of constrained property trends generated by an embodiment of the present invention for a given geological unit.

DETAILED DESCRIPTION OF THE INVENTION

Figure 1:
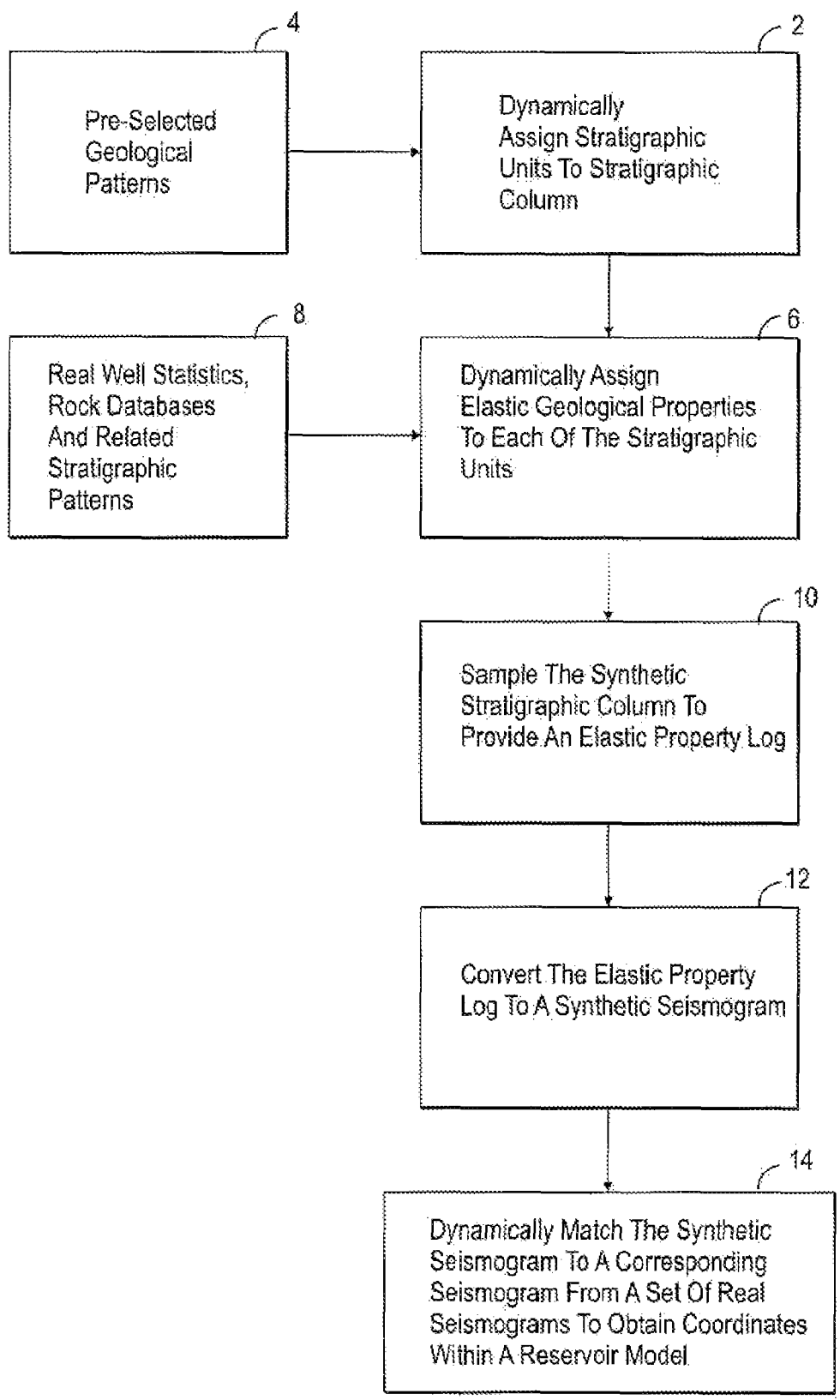
FIG. 1 illustrates a flowchart of the workflow of one embodiment of the present invention.

While this invention is susceptible of embodiments in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

The present invention is an improved method of estimating subsurface reservoir properties and characteristics utilizing geological constraints. The improved method includes utilizing deterministic and probabilistic constraints. The method utilizes a stratigraphic framework which provides a complete label system for each pseudo-well, comprehensive stratigraphic rules and constraints from geological interpretation and realistic property distribution rules.

The pseudo-wells generated by the improved method can be used in a number of applications. For example, the pseudo-wells can be used in reservoir Net-to-Gross estimation and high resolution seismic inversion. The pseudo-wells can also be used as a direct source to Probabilistic Amplitude versus Offset ("P-AVO").

The present invention provides fully labeled, geologically meaningful pseudo-wells. Even when there are sparse real-world well data, there is still a great deal of information about the depositional environment and what possible range of stratigraphic architectures may in occur in subsurface environments. The present invention utilizes internal markers and reservoir architecture, if known, to create pseudo-wells where internal architecture and stacking patterns are based on real wells. In the absence of detailed knowledge of the internal architecture, the present invention creates likely pseudo-well stacking patterns, sand/shale ratios, bed thicknesses, etc. by utilizing information from the larger scale geological environment, and the typical depositional elements within this environment to create pseudo-wells. The present invention also incorporates any real well data that exists.

FIG. 1 illustrates a workflow of one embodiment of the present invention. The present invention includes dynamically assigning a plurality of stratigraphic units to a stratigraphic column 2 based on pre-selected geological patterns 4. The stratigraphic unit is one dimensional ("1D") with only a vertical dimension. Unlike a static assignment of a stratigraphic unit where the vertical dimension is set, the present invention includes dynamically assigning the stratigraphic units to the stratigraphic column 2. The dynamic assignment enables the stratigraphic units in a particular column to be stretched and squeezed vertically to fit an actual vertical geological pattern of interest.

The present invention also includes dynamically assigning elastic geological properties to each of the stratigraphic units 6. The elastic geological properties are based on real well statistics, rock property databases and related stratigraphic patterns 8. The elastic geological properties are dynamically assigned to the stratigraphic units so that the properties can be adjusted depending on the geological environment that is being characterized. The present invention further includes sampling the synthetic stratigraphic column to provide an elastic property log 10, and converting the elastic property log to a synthetic seismogram 12. The present invention includes dynamically stretching and squeezing the synthetic seismogram to match a corresponding seismogram in a set of real seismograms. Once the synthetic seismogram is dynamically matched to a corresponding real seismogram 14, the corresponding geological properties of the modified synthetic seismogram can then be associated with the corresponding underlying set of pseudo-logs. This process of dynamic matching of synthetic seismograms to real seismic data is used to assign coordinates for the synthetic stratigraphic columns within the reservoir model 14.

It should be understood that because of the non-uniqueness of the seismogram, the present invention can generate multiple matching synthetic seismograms that match a particular real-world seismogram. Thus, the present invention will be able to generate multiple reservoir models that have differing subsurface characteristics. However, each of the reservoir models generated by the present invention will satisfy all of the available stratigraphic, geologic and seismic constraints and therefore these models will be better estimates of subsurface reservoir properties and characteristics than prior art methods.

Figure 2:
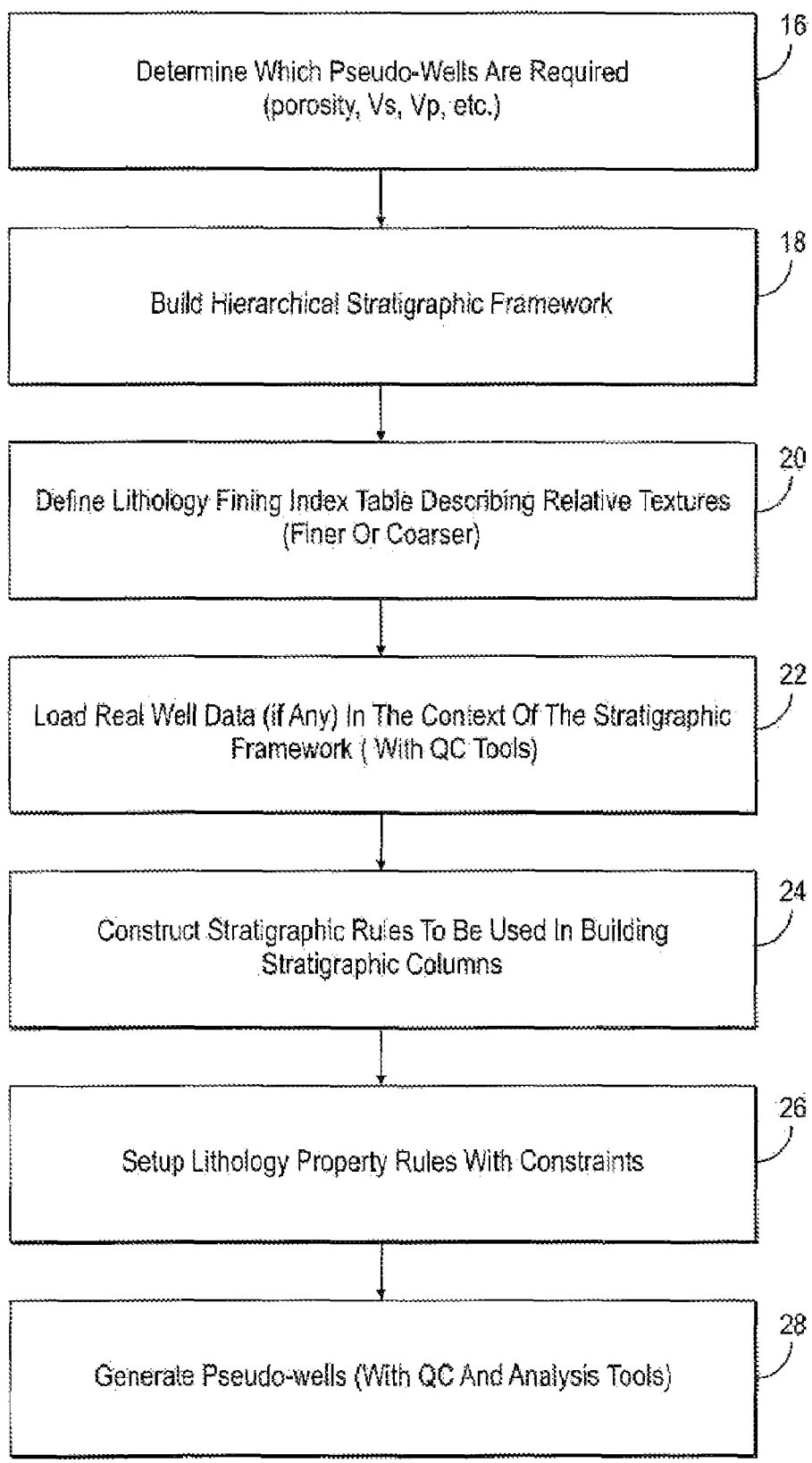
FIG. 2 illustrates a flow chart of the workflow of one embodiment of the present invention.

FIG. 2 illustrates one embodiment of the present invention, wherein the first step is the identification of the types of pseudo-well logs that will be generated. For example, what types of lithologic properties 16, porosity, Vs, Vp, etc. will be required to characterize a particular reservoir model. Once the lithological property logs that are to be generated are established 16, a geologically conditioned hierarchical stratigraphic framework is built 18. A lithology fining index table is then defined describing relative textures (finer or coarser) between each applicable lithology component 20. The next step in this embodiment of the present invention is real well data, if any, is uploaded into the stratigraphic framework 22. Stratigraphic rules are then constructed, and those stratigraphic rules will be used to build synthetic stratigraphic columns 24. Once the stratigraphic rules are constructed, the lithology property rules are established with constraints 26 and the pseudo-wells are generated 28.

Figure 3:
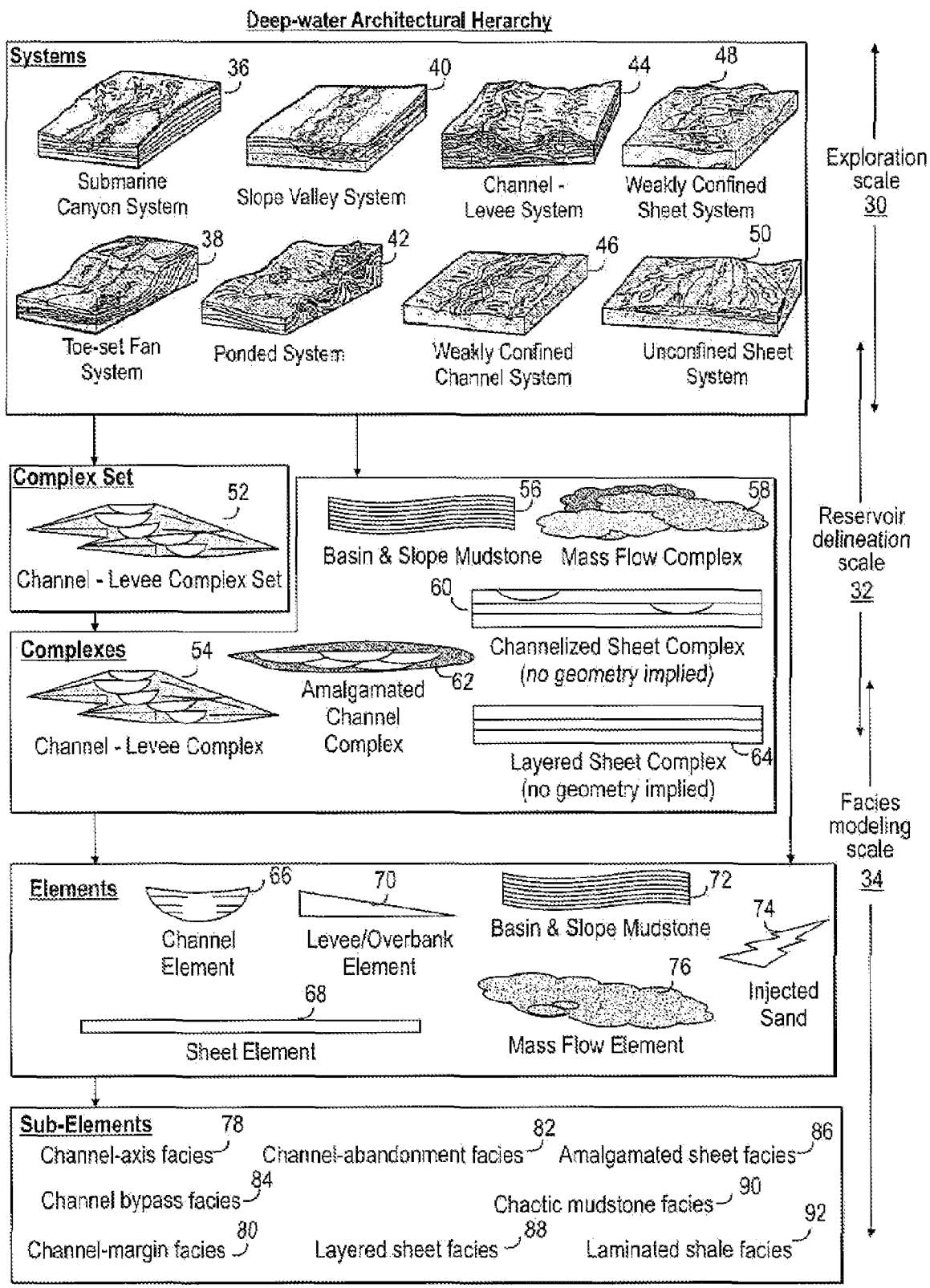
FIG. 3 illustrates an example of a deep-water architectural hierarchy utilized by the present invention.

The present invention builds the hierarchical stratigraphic framework 18 utilizing information about the depositional environment and the range of stratigraphic architectures that can occur in particular subsurface environments. For example if the reservoir to be characterized was a deep-water subsurface reservoir, then the differing types of stratigraphic architecture possible for the deep-water architectural hierarchy would be evaluated. FIG. 3 provides an example of a deep-water architectural hierarchy. There are three scales or levels of granularity illustrated in FIG. 3, an exploration scale 30, a reservoir delineation scale 32 and a facies modeling scale 34. Typically, the exploration scale will include "systems" which are depositional packages between major stratigraphic surfaces. The systems included in this example include a submarine canyon system 36, a toe-set fan system 38, a slope valley system 40, a ponded system 42, a channel levee system 44, a weakly confined channel system 46, a weakly confined sheet system 48 and an unconfined sheet system 50. Moving from the exploration scale 30 to the more detailed reservoir delineation scale, a system can include one or more combinations of elements, complexes and/or complex sets.

An "element" is a volume of sediment deposited within a single cycle of deposition prior to construction and avulsion (or abandonment). Elements can be considered the elementary architectural units. FIG. 3 provides examples which are found in the deep-water architectural hierarchy. Those elements include a channel element 66, a sheet element 68, a levee/overbank element 70, a basin and slope mudstone 72, injected sand 74 and a mass flow element 76. A "complex" is a stack of two or more architecturally similar elements with similar stacking patterns or a genetic relationship. Examples of complexes in the deep-water architectural hierarchy include a channel-levee complex system 54, a basin and slope mudstone 56, a mass flow complex 58, a channelized sheet complex (no geometry implied) 60, an amalgamated channel complex 62 and a layered sheet complex 64. It is rare that a system would include multiple elements that would not form a complex. A "complex set" is a stack of two or more related complexes or elements. The architectural style of the individual complexes may be similar or different. An example of a complex set is a channel-levee complex set 52.

In the deep-water architectural hierarchy as the scale or granularity moves from the reservoir delineation scale to the more detailed level of the facies modeling scale 34, there are "sub-elements" which include lithofacies or facies associates within the elements. In the example shown in FIG. 3, the sub-elements include channel-axis facies 78, channel-margin facies 80, channel-abandonment facies 82, channel bypass facies 84, amalgamated sheet facies 86, layered sheet facies 88, chaotic mudstone facies 90 and laminated shale facies 92.

Figure 4:
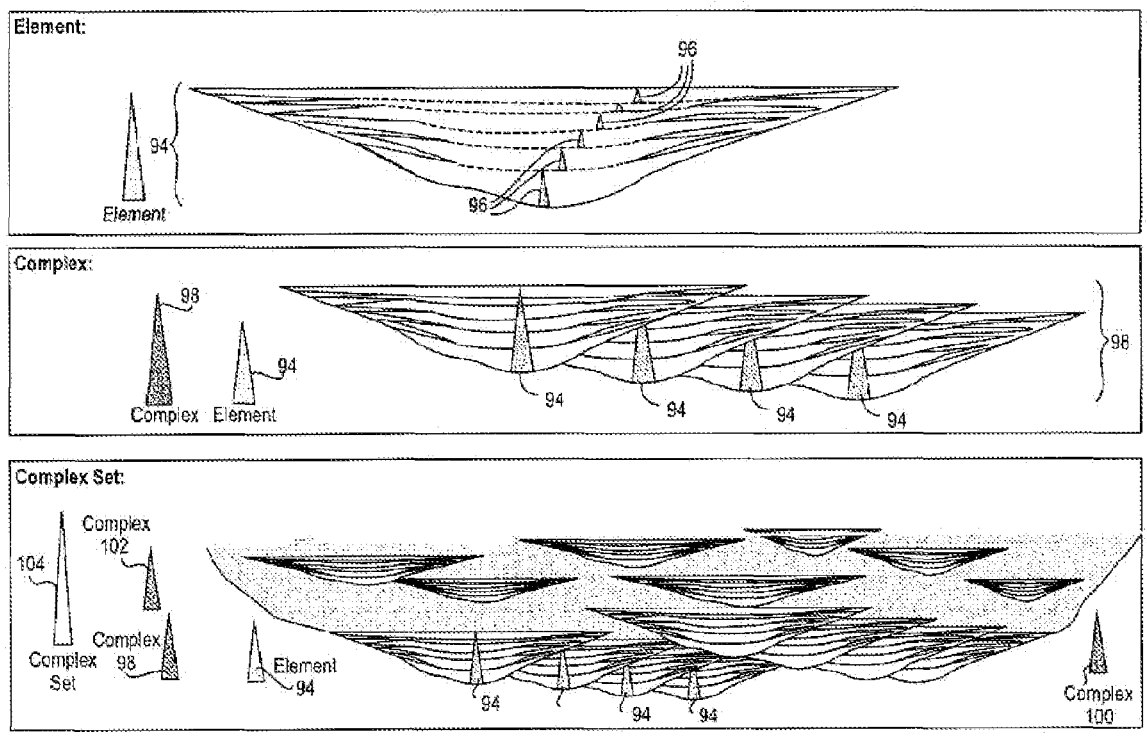
FIG. 4 illustrates a side-view of an example of stratigraphic framework.

FIG. 4 illustrates the relationships of complex sets, complexes and elements from a vertical perspective in a subsurface environment. An element 94 consisting of six storeys 96 is illustrated. A "storey" is a volume of sediment within a channel which is separated by scour surfaces. As the scale increases for this particular geology, a complex 98 is illustrated, and this particular example of a complex 98 includes four elements 94. Each of those elements 94 contains a different number of storeys. For further illustration of a stratigraphic framework, a geological complex set 104 is also shown in FIG. 4. There are three complexes 98, 100, 102 shown in this complex set 104.

In building the stratigraphic framework, the present invention utilizes existing available seismic data interpretations. The seismic data interpretation provides geological information at an exploration 30 and a reservoir delineation scale 32, and to some extent at the facies modeling scale 34. Thus, index maps generated from the available seismic data interpretation are used to constrain the type of system, complex sets, complexes, elements and sub-elements mat may exist at any particular location in the subsurface environment of interest.

Figure 5:
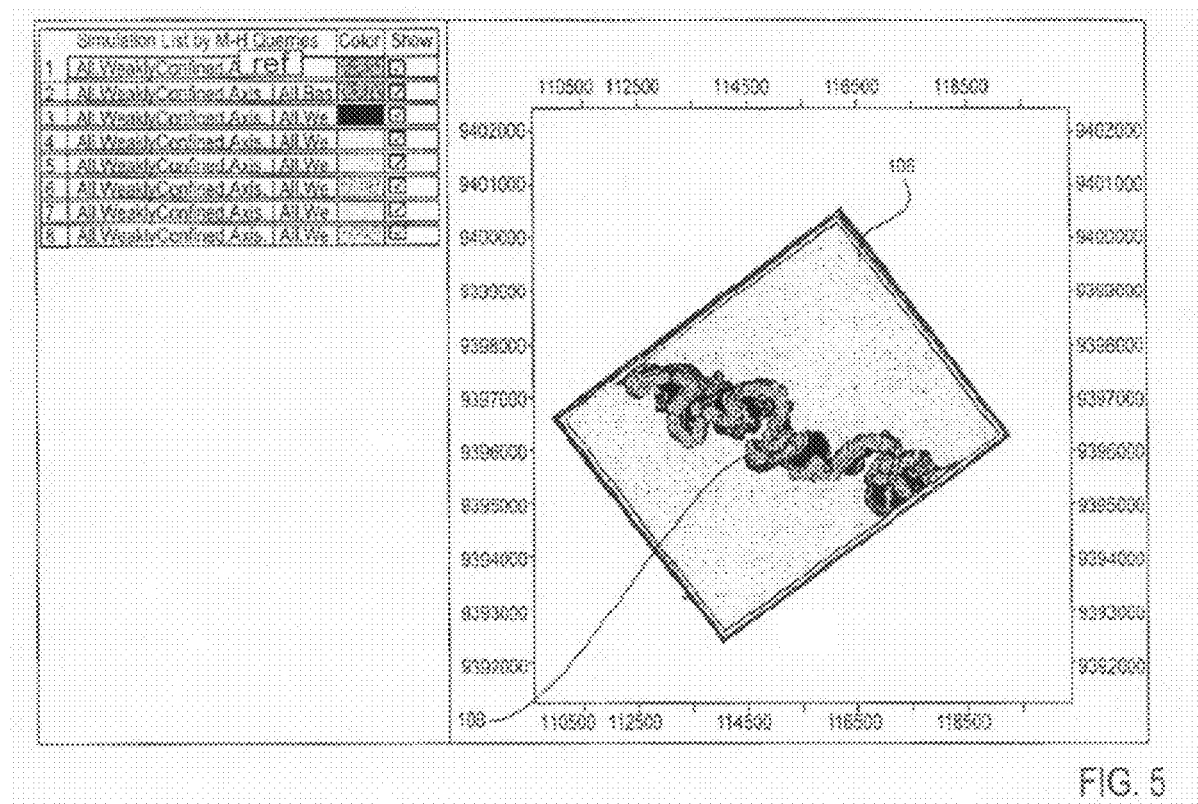
FIG. 5 illustrates a top-view of an example of an index map illustrating an interpreted subsurface reservoir including geological complex set.
Figure 6:
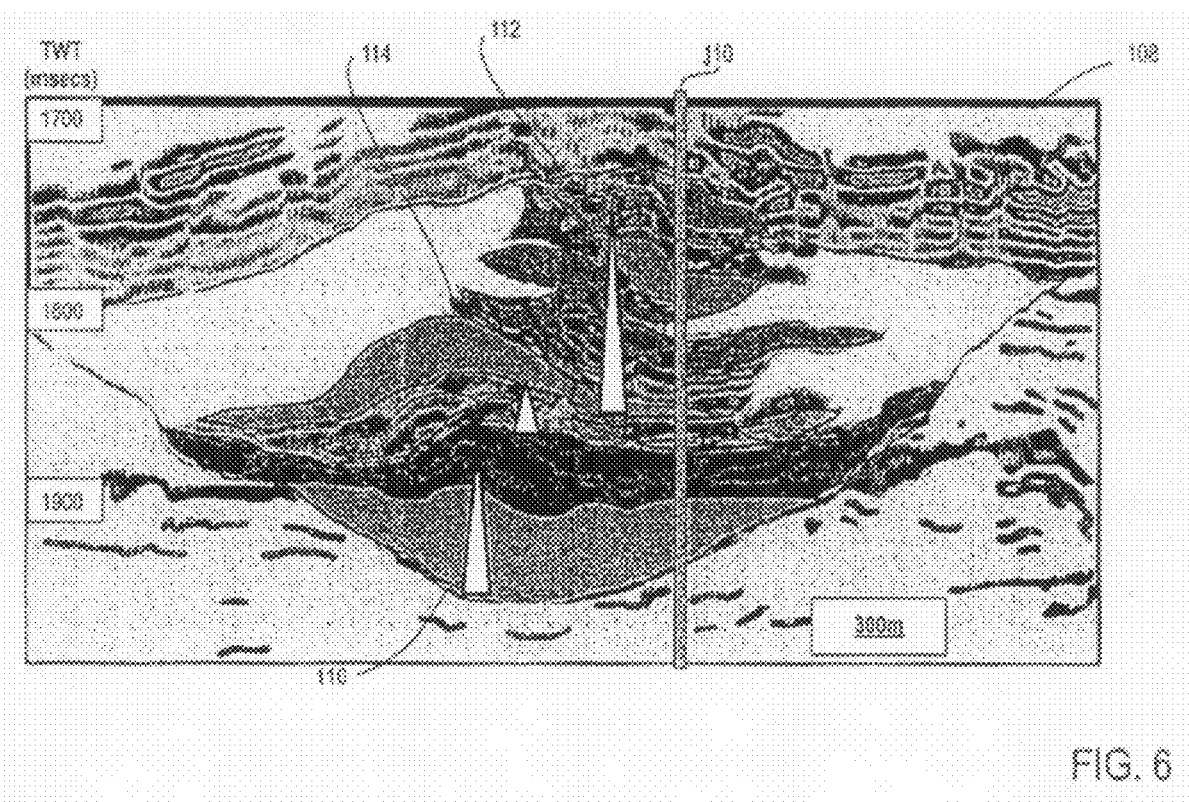
FIG. 6 illustrates a side-view of the complex set of the interpreted subsurface reservoir of FIG. 5, the reservoir additionally includes one well.

FIG. 5 illustrates an example of an index map 106, wherein a top view of a number of channel elements 108 is shown. Each of those channelized elements 108 is vertically stacked on top of each other, and those elements 108 make up a plurality of geological complexes which would be of interest as potential hydrocarbon reservoirs. FIG. 6 illustrates a side-view of the channelized elements 108 which was generated from available seismic data interpretation. A well 110 has been drilled through the reservoir 108, and has penetrated three geological complexes 112, 114, 116. The first complex 112 penetrated by the well 110 is an amalgamated channel complex. The second complex 114 penetrated by the well 110 is a non-amalgamated channel complex. The third complex 116 penetrated by the well 110 is a vertically aggrading channel complex. It should be appreciated that this is one example of an interpretation of the available seismic and well log data, and that there may be other potential interpretations of the seismic data and well log data.

Figure 7:
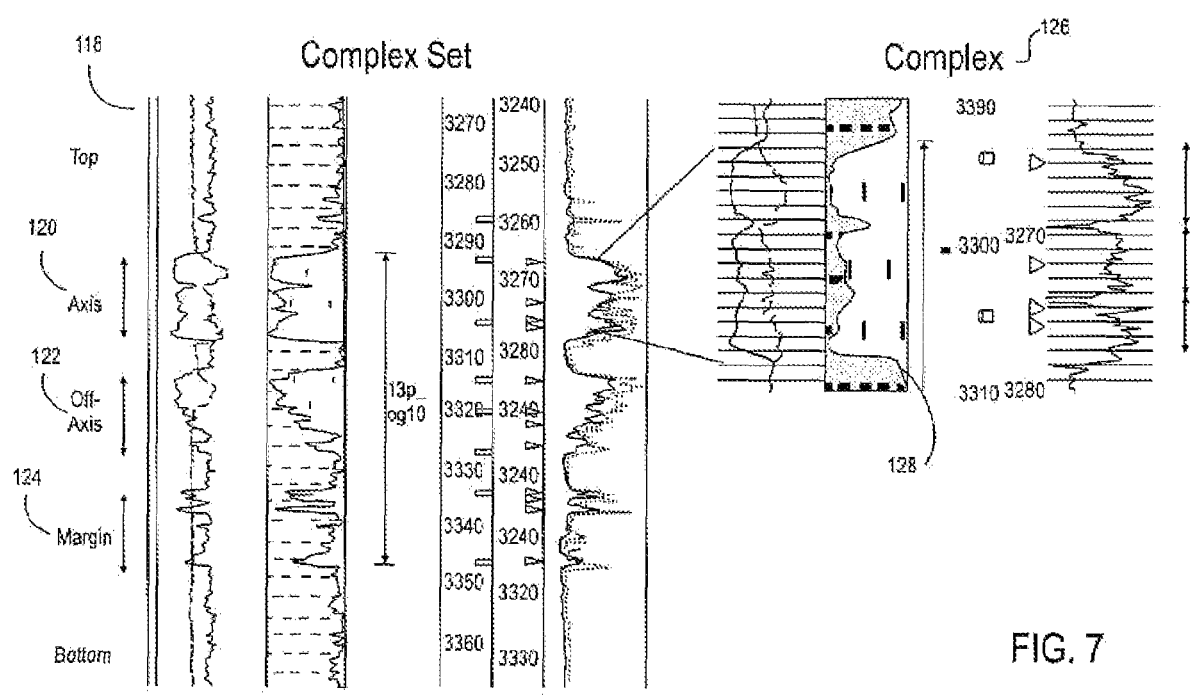
FIG. 7 illustrates a well log of a geological complex set of the interpreted subsurface reservoir illustrated in FIGS. 5 and 6.

As described-above, well log data is also a source of information for the present invention. This data is used to increase understanding of the subsurface geology and constrain the stratigraphic framework. FIG. 7 illustrates an example of well log data illustrating a section of data representing what has been interpreted to be a complex set 118 representing several stacked channel complexes in the subsurface reservoir. The well log data in this example has been interpreted as a channel axis dominated complex 120, a channel off-axis dominated complex 122 and a channel margin dominated complex 124 comprising the complex set. The channel axis dominated complex is comprised primarily of vertical segments that go through the central thicker portion of the channel system. The channel axis dominated complex component 120 of the complex set 118 being highlighted as the geological complex 126 of interest in this well log data. Within that geological complex 126 is a particular pattern 128 of velocity increasing with depth within a massive sandstone element at the base of an interpreted axis dominated complex. The present invention will utilize such patterns to constrain the stratigraphy and other properties of the synthetic columns.

Figure 8:
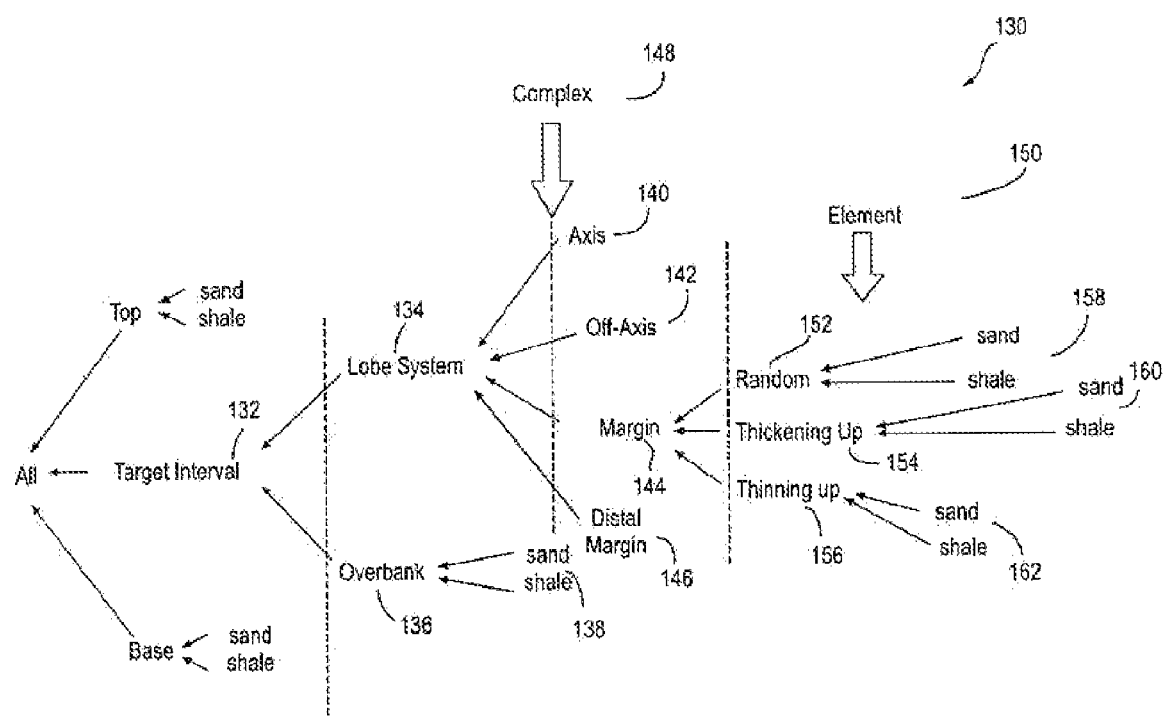
FIG. 8 illustrates an embodiment of a stratigraphic framework utilized by the present invention.

The present invention utilizes a stratigraphic framework that is built based upon an understanding of the stratigraphy of the geological volume of interest from all available data sources. FIG. 8 provides an example of a stratigraphic framework 130 that was generated for a subsurface system. FIG. 8 illustrates a target interval 132 that was chosen, and within that target interval 132 two complexes, a lobe system 134 and an overbank 136 were identified. The stratigraphic framework 130 includes the lithology of the overbank 136 as being sand and shale 138. The stratigraphic framework 130 for the lobe system 134 is divided into its components, the axis 140, off-axis 142, margin 144 and distal margin 146. As the scale moves from the geological complex level 148 to the element level 150, this particular example focused on the lithology of the margin 144 of the lobe system 134. Three scenarios were generated for the possible lithology of the margin 144, those possible scenarios were random 152 thickening up, 154 and thinning up 156. The present invention utilizes available information about the depositional environment and the stratigraphic architectures in that particular system to build a hierarchical stratigraphic framework 130. For all three scenarios in this embodiment of the present invention, the lithology was sand/shale 158, 160, 162.

The present invention additionally constructs stratigraphic rules which are used to build the synthetic stratigraphic columns. For example, the present invention accounts for the thickness variations of the lithology or depositional units when constructing the synthetic stratigraphic columns. That information may already be available through seismic data analysis and interpretation and real-world well logs. FIG. 9 illustrates an example of thickness distributions at both the lithologic and depositional unit scales generated from database examples of different depositional environments. For a given geological unit that is associated in a synthetic stratigraphic column, based on an understanding of the depositional environment, FIG. 9 illustrates five depositional or lithology units of different thicknesses that could be associated with this particular unit of a synthetic stratigraphic column. The lithology units vary in thickness and type. A massive sand 164, an interbedded sand and shale 166, a second interbedded sand and shale 168, a laminated sand and shale 170 and a massive shale 172 are all represented as potential units of a unit in a synthetic stratigraphic column. FIG. 9 also includes two graphs, the first graph illustrates the thickness distribution of the lithology units 174 and the second graph illustrates the thickness distributions of the sand 176 with the lithology units. The present invention utilizes such thickness distributions to impose those patterns on the generated synthetic stratigraphic columns.

Figure 10:
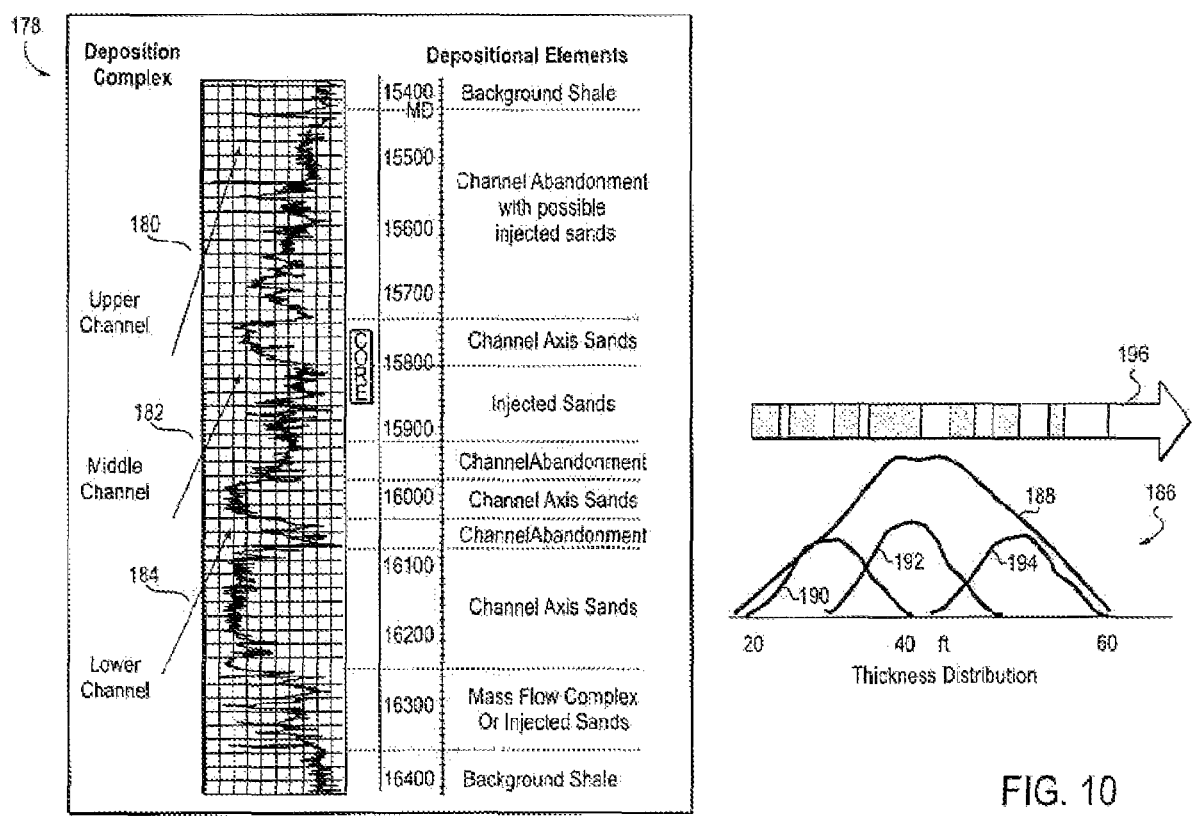
FIG. 10 illustrates an example of an interpreted stratigraphic column illustrating successive depositional trends and its related thickness distribution which is utilized by the present invention.

The present invention also utilizes depositional trend information from available real-world well data. FIG. 10 illustrates a stratigraphic column 178 wherein the successive depositional trends that is observed is that of fining upwards of three vertically stacked channel elements, an upper channel element 180, a middle channel element 182 and a lower channel element 184. This means that, in this example, for each of these depositional sequences we observe that the relative amount of shale present statistically increases as we go towards the top of the sequence while the relative amount of sand decreases.

A further piece of information noted from this example is that the sand thickness statistically increases downwards while the shale thickness decreases. The invention is able to utilize this information to automatically impose these patterns on the generated synthetic stratigraphic column elements. As one skilled in the art can appreciate, geological properties are not monotonic, but rather, are interrelated. FIG. 10 also includes a distribution curve 186 that is utilized by the present invention for sand thickness. The distribution curve 186 includes a total distribution curve 188 and within that curve 188 are three subdistribution curves 190, 192, 194. Those subdistribution curves 190, 192, 194 overlap and illustrate that the thickness of the sands can overlap 196 and do not increase linearly. Some thinner sands 190 are interplaced between the medium thickness sands 192 and some medium thickness sands 192 are interplaced between the large thick sands 194. The present invention incorporates these types of relationships in generating the synthetic columns.

In addition to the stratigraphic and geologic elements the present invention has the facility to populate the generated synthetic stratigraphic columns with lithology or lithofacies properties. As mentioned previously, an initial part of the pseudo-well generation process is the identification of the types of pseudo-well logs (porosity, Vs, Vp, etc.) that will be required to characterize a particular reservoir. The present invention includes several methods for assigning these particular lithology property values according to various geological, geophysical and rock physics rules with appropriate constraints.

Figure 11:
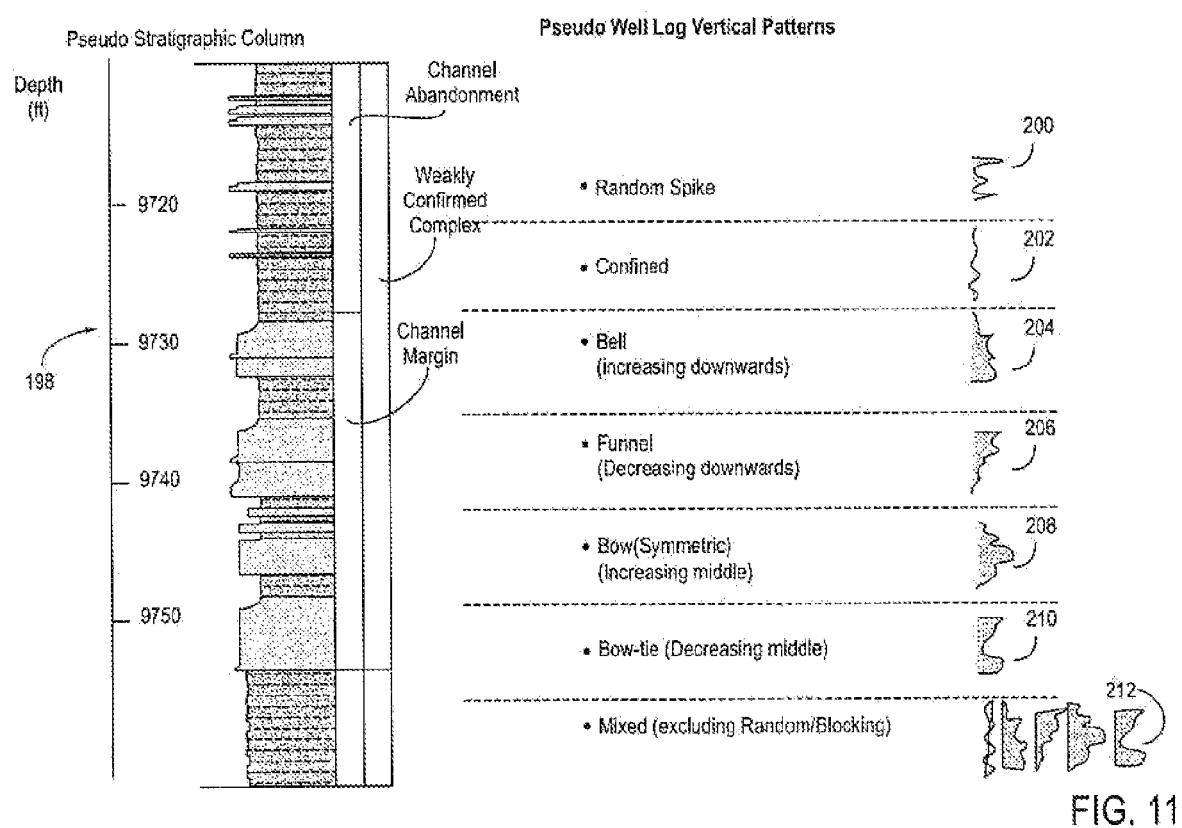
FIG. 11 illustrates a portion of a pseudo stratigraphic column and examples of possible geological properties that could be assigned to the units of the column as utilized by the present invention.

It is clear that lithology property values will vary as the lithology varies in a stratigraphic column. However, it is often the case that the lithologic property values need to vary even within a specific homogeneous lithologic unit. There are several reasons for this such as grain size sorting and compaction of the unit. FIG. 11 illustrates examples of vertical patterns that can be imposed on any lithology property in any particular unit of a pseudo stratigraphic column 198. For a given layer of lithology, examples of the elastic properties are Random/Spike 200, Confined 202, Bell (increasing downwards) 204, Funnel (descreasing downwards) 206, Bow (symmetric, increasing middle) 208, Bow-Tie (decreasing middle) 210 and Mixed (excluding Random/Blocking). Those patterns not only apply to elastic properties (velocity, density etc.) but can also be applied to any property of a geological interval including the proportion of any particular lithology. Clearly, these trends are not necessarily monotonic, and so the implementation of this functionality is probabilistic in nature.

In FIGS. 12A and 12B, there are a number of actual examples of property trends generated by the present invention for a given interval. The first illustration in FIG. 12A is for a sand axis interval 214 which shows various well log patterns for Volume of Shale ("Vshale") generated by the present invention wherein, in general, the Vshale is increasing upwards (Funnel-Shaped). The second illustration in FIG. 12B is for sand off axis interval 216 which again shows various well log patterns for Vshale by the present invention wherein, in general, the Vshale is increasing middlewards (Bow-Shape). As one can appreciate, although multiple Vshale patterns were generated by the present invention, they are constrained by a generalized pattern, in these cases Funnel-Shape and Bow-Shape. Thus the present invention utilizes existing geological information of the region of interest to constrain the various properties that will be associated with the units within a given synthetic stratigraphic column.

Figure 13A:
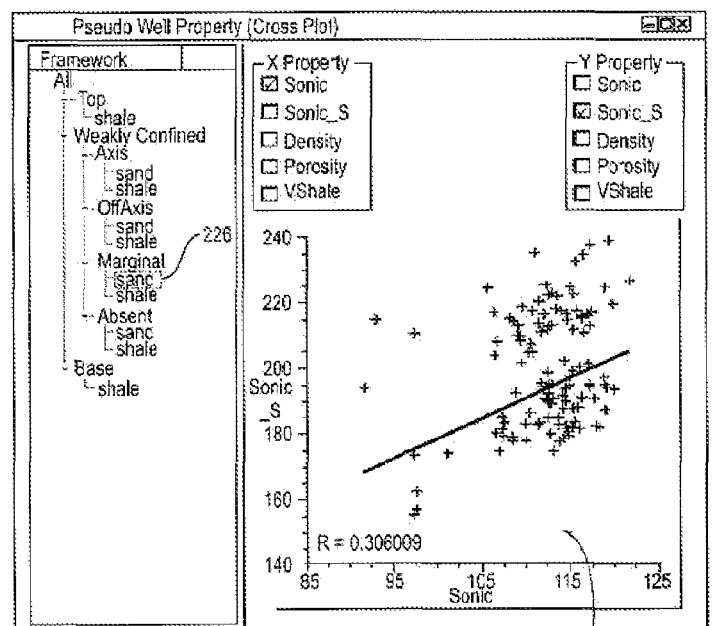
FIGS. 13A and 13B illustrate an example of correlation cross-plots for geological properties from real well-log data and pseudo well data utilized by the present invention.
Figure 13B:
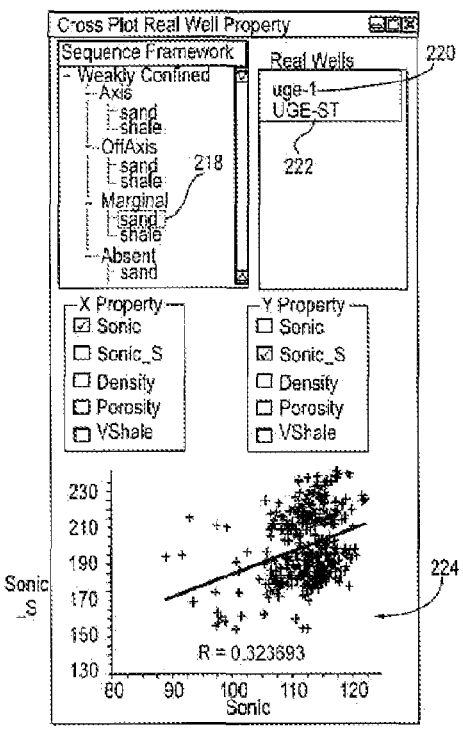

In the real world, lithologic properties are not just random numbers. In actual rocks there are often relationships and dependencies between the properties associated with these rocks. This invention contains a tool to determine these relationships for real well data. The tool analyses correlations between all the required rock properties, for each lithology and at all levels of the stratigrahic framework hierarchy. FIGS. 13A and 13B illustrates the cross plots utilized by the present invention to analyze the correlations between the geological properties. In this example, the present invention utilizes real well data that is available for a particular region of interest. Two wells 220, and 222 are identified for a unit 218 within a stratigraphic framework. Known properties and their relationships with each other are correlated using a cross plot 224 illustrated in FIG. 13B. In this particular example, the properties chosen for the plot 224 were sonic and sonic shear. Using the identified correlations, the present invention utilizes the real-world correlations to constrain the properties associated with the units of the synthetic columns. Thus, the properties associated with the units of the synthetic column will be similar to that of real wells. FIG. 13A illustrates a cross plot 228 of sonic and sonic shear for a unit 226 in a similar synthetic column as the real world unit 218 from the well log data.

Figure 14:
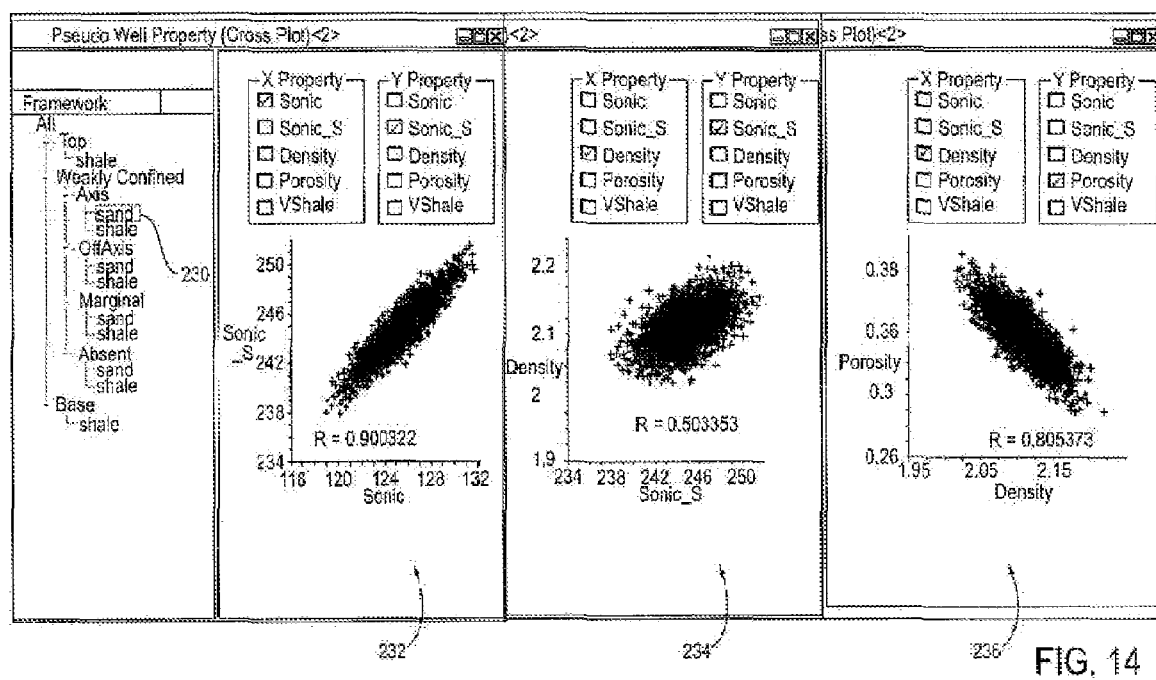
FIG. 14 illustrates examples of correlation cross-plots of the imposed correlation constraints between the pseudo-log geological properties for each particular lithology unit.

Once we have determined the correlation relations between the various rock properties of interest these act as a constraint when these properties get assigned as part of the pseudo-well building process. The invention has the facility to impose these correlation constraints subject to actual physical limitations on what these properties can be for real world geology. FIG. 14 illustrates additional examples of cross plots 232, 234, 236 used to constrain the properties which are assigned to a particular unit 230 in a synthetic column including sonic, sonic shear, density and porosity.

It should also be understood that the use of real well data will be used where the depositional environment is similar to the environment sampled by the well. As one skilled in the art will appreciate, well log data at times can be very localized and decisions as to how representative of an area the well log data is must be done on a case by case basis.

Figure 15:
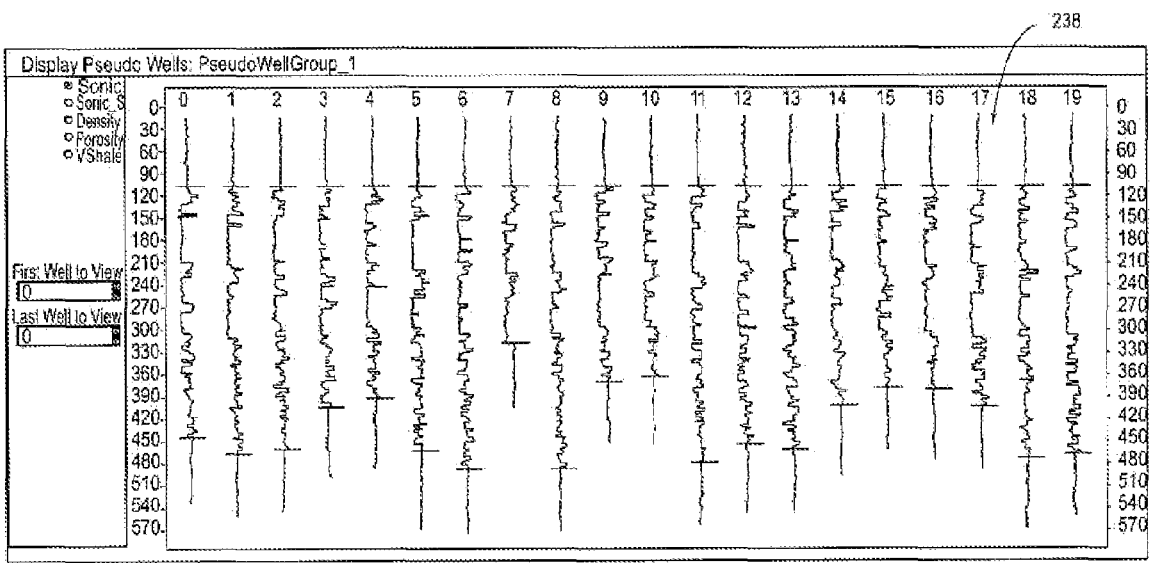
FIG. 15 illustrates examples of the final pseudo-logs as generated by the present invention.

When all the geological, geophysical and petrophysical constraints have been taken info account then the invention can build the synthetic stratigraphic columns from which can be generated the pseudo-well logs for the properties of interest. FIG. 15 illustrates examples of synthetic or pseudo-well logs 238. The pseudo-stratigraphic columns and pseudo-logs generated by this invention have all the characteristics of real well data except actual spatial locations. In other words these stratigraphic columns are possible descriptions of the actual reservoir intervals but the locations of where those columns exist are unknown.

Figure 16:
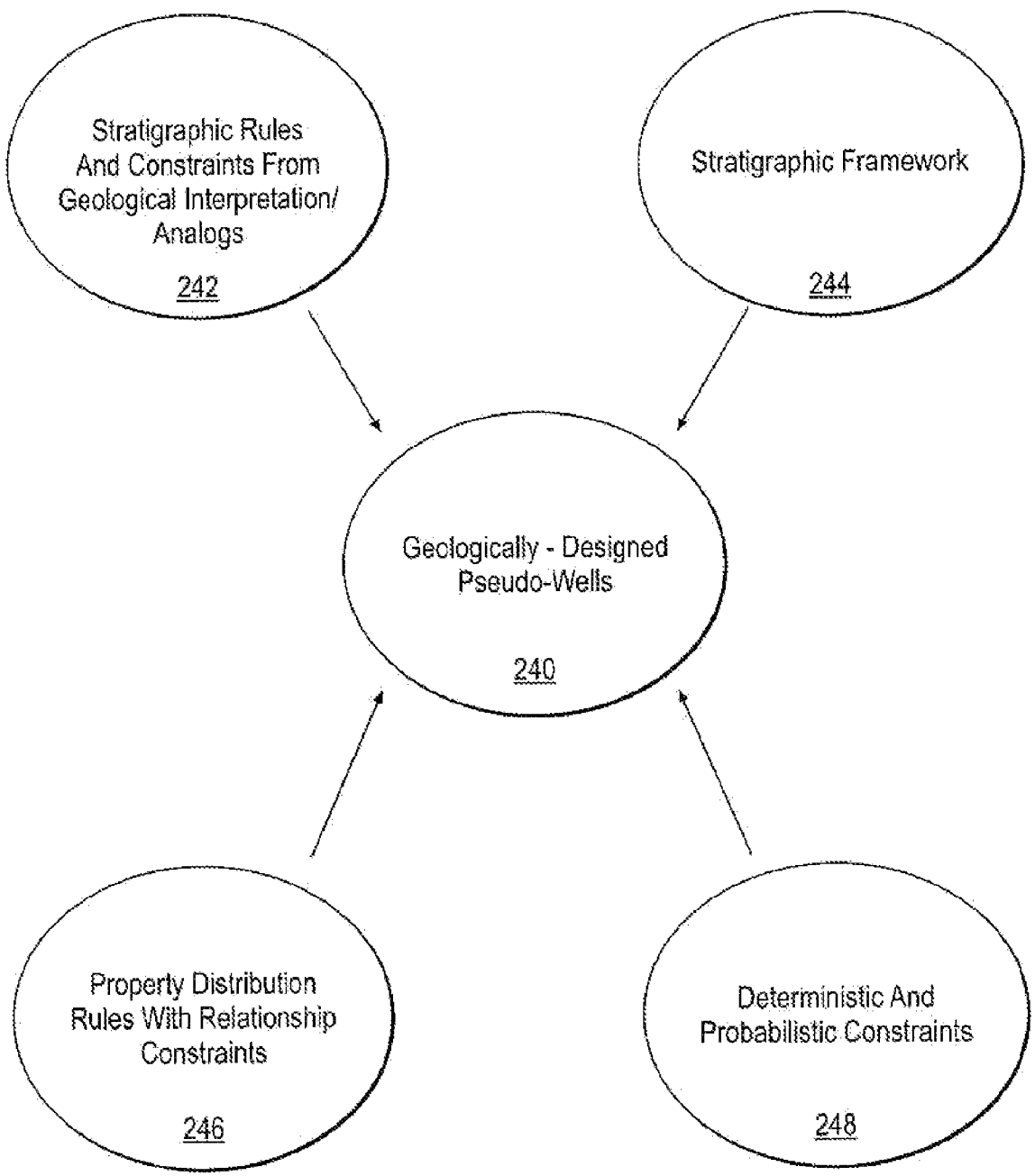
FIG. 16 illustrates a workflow of one embodiment of the present invention.

Thus, referring to FIG. 16, the present invention generates geologically-designed pseudo-wells 240 utilizing stratigraphic rules and constraints from geological interpretation 242, stratigraphic framework 244, property distribution rules with relationship constraints 246, and deterministic and probabilistic constrains 248.

In order to determine the actual locations at which these pseudo-wells might represent the actual real world reservoir interval we need to compare these synthetic columns to real world data that does have spatial coordinates. In this embodiment of the present invention, the real world data that is used is the actual recorded seismic data. Since we can generate pseudo-logs of the elastic properties, velocity and density, it is possible to make impedance pseudo-logs. The invention includes a method for using these synthetic impedance logs to model synthetic seismic traces which can then be compared on a location by location basis with the actual real seismic data traces.

The final product of this particular embodiment of the invention is a set of actual reservoir models at actual log resolution. One of the major problems inherent in a seismic trace comparison approach is that seismic data is band-limited and hence the pseudo-stratigraphic column frequencies outside the seismic pass-band are not constrained by the seismic waveform. Therefore a standard unconstrained seismic comparison would result in many pseudo-stratigraphic columns that would match the actual seismic waveform but would not be a good solution from a geologic or stratigraphic perspective.

Figure 17:
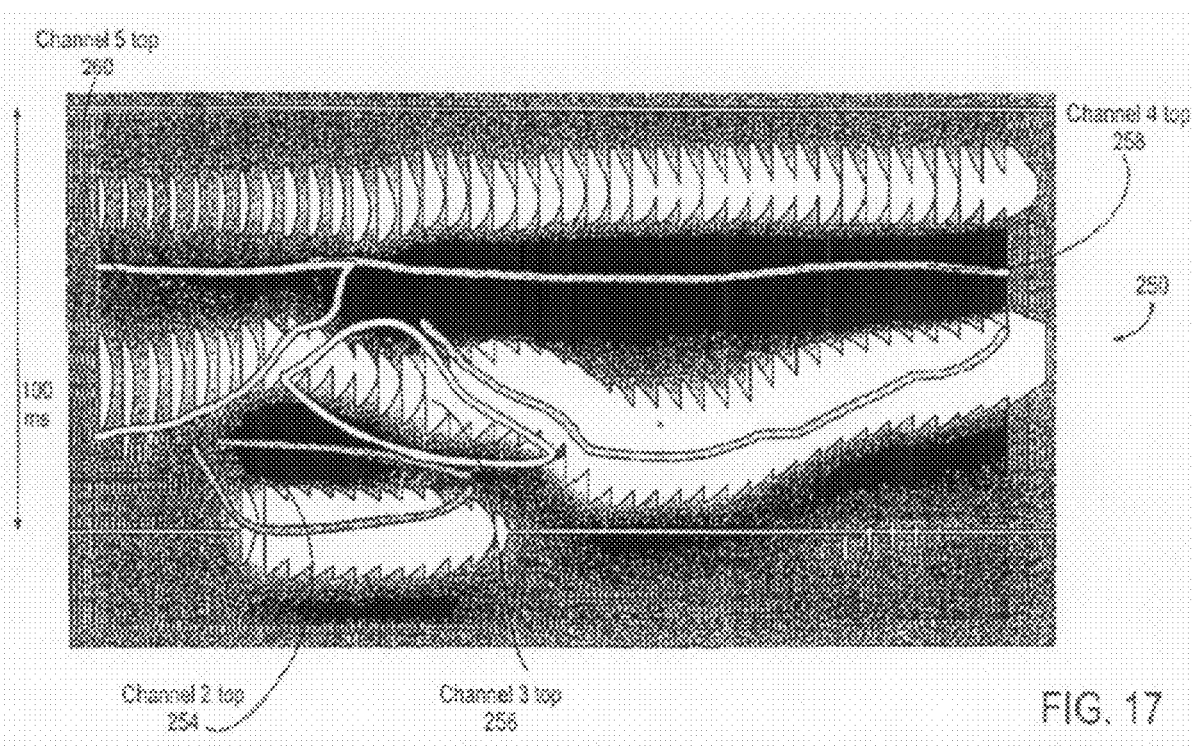
FIG. 17 illustrates an example of interpreted seismic horizons delineating channel boundaries.
Figure 18:
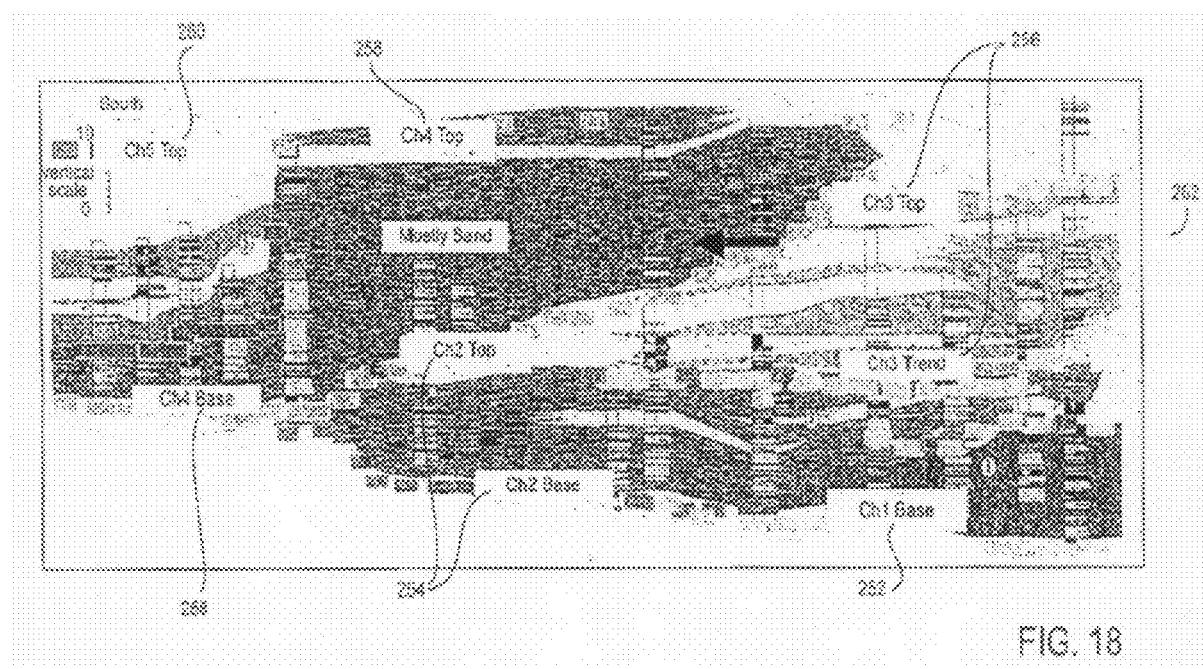
FIG. 18 illustrates a side view of the interpreted bed correlation of the channel complex illustrated in FIG. 17.

The present invention mitigates this problem by allowing the previously generated pseudo-wells to be modified dynamically in response to additional information in the form of interpreted boundaries 250 (FIG. 17), of actual geologic features 262 (FIG. 18), related to geologic channels or units 252, 254, 256, 258 and 260, in the real seismic volume. This user provided interpretational information is utilized by the invention in several important ways.

Figure 19:
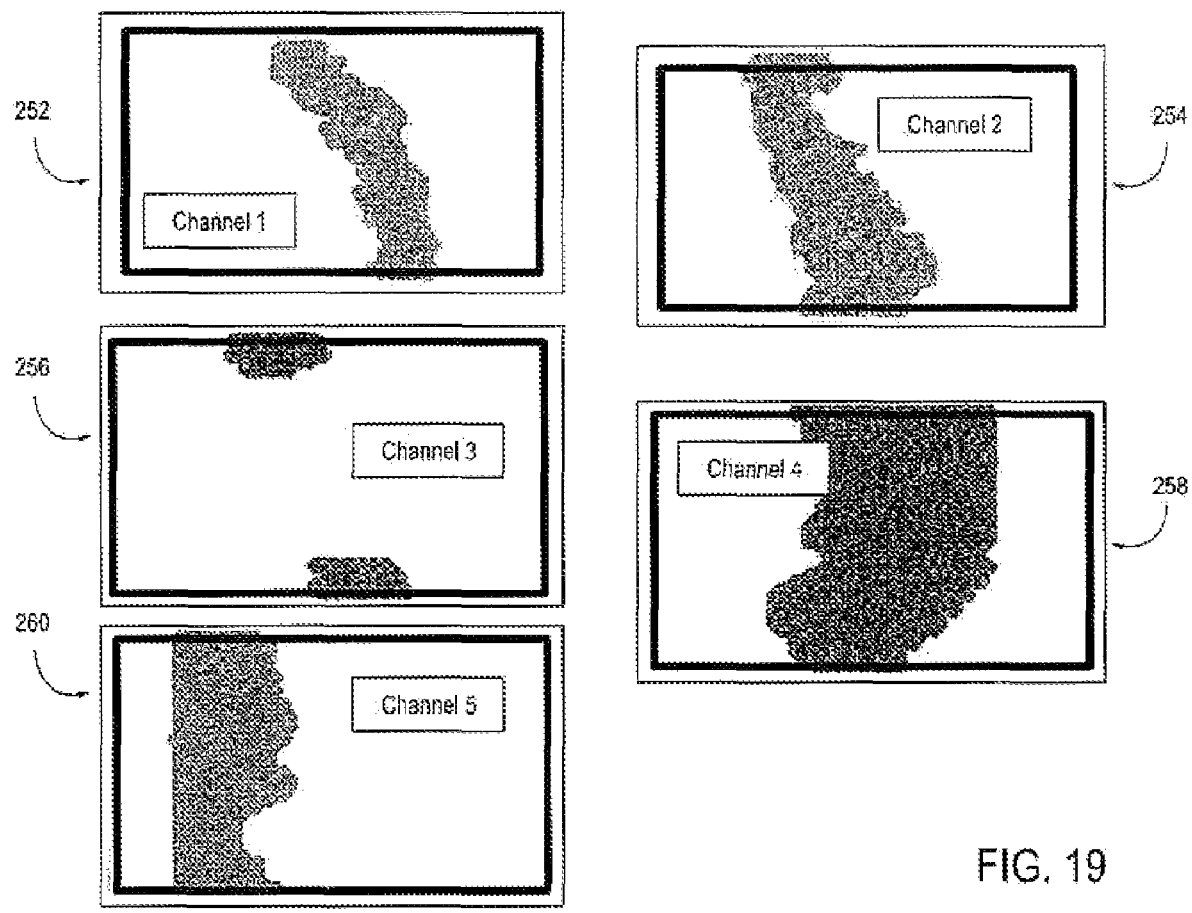
FIG. 19 illustrates a map view of each of the channel systems illustrated in FIG. 17.
Figure 20:
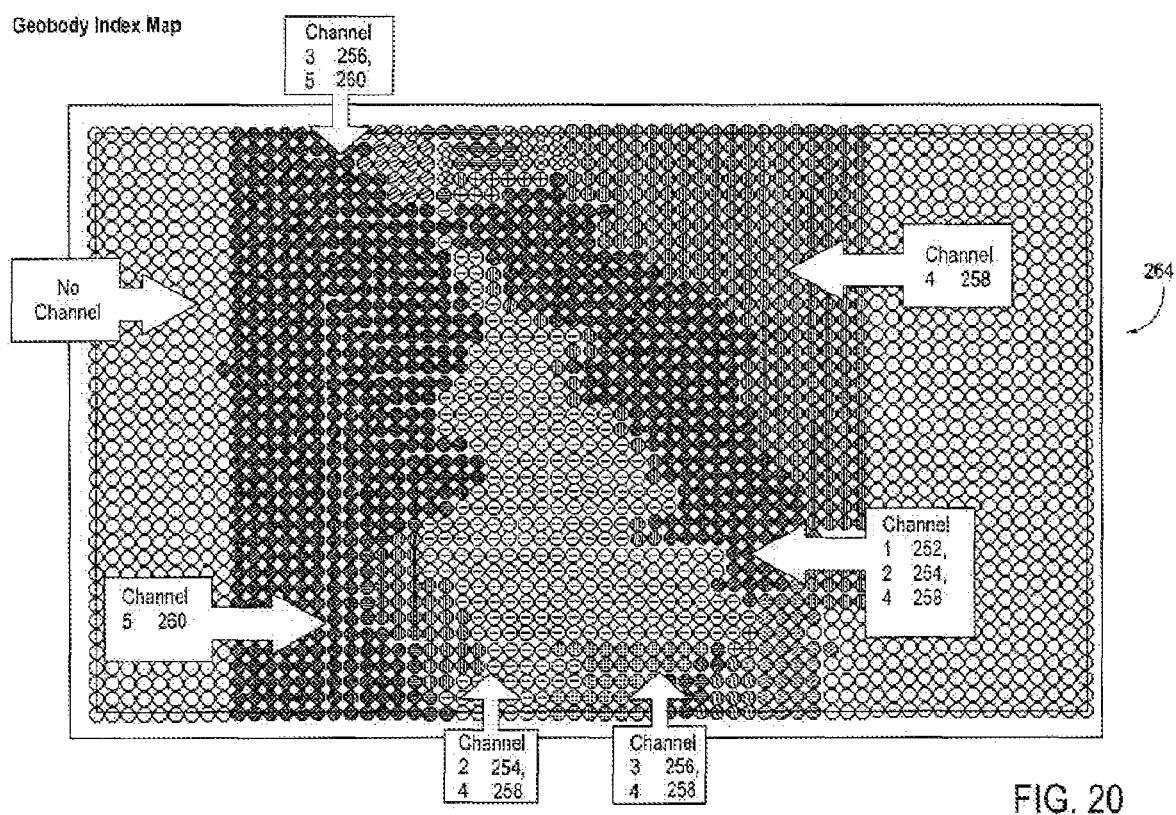
FIG. 20 illustrates a geobody index map of the channel systems illustrated in FIG. 17.
Figure 21:
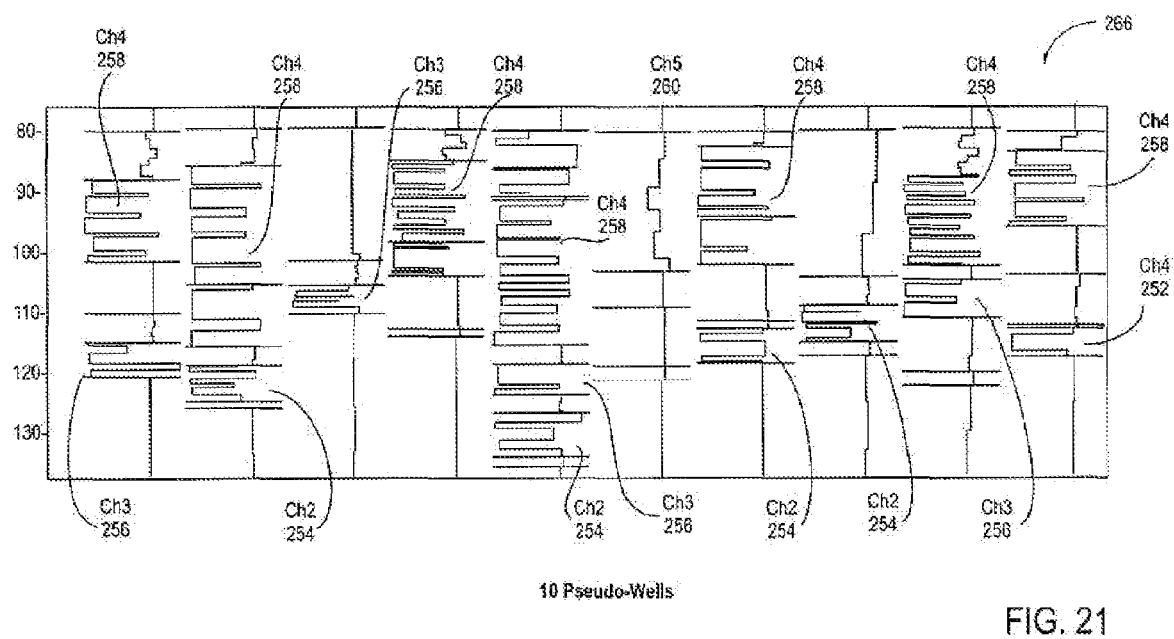
FIG. 21 illustrates an example of a plurality of synthetic columns having a vertical combination of channels which has been generated by one embodiment of the present invention.

In the first instance it provides a geologic existence constraint. The information concerning individually interpreted geologic units, 252, 254, 256, 258 and 260 (FIG. 19) is incorporated into a geobody index map. FIG. 20 illustrates an index map 264 depicting which combination of these interpreted units 252, 254, 256, 258 and 260 is present at any particular trace location. This existence constraint plays an important role in tire comparison process between synthetic and actual real seismic trace data. By interrogating the geobody index map, the only pseudo-wells that actually undergo the seismic comparison test at any particular location are the ones that satisfy the existence constraints with respect to interpreted features. Thus, for example, if channel one 252 and channel two 254 are interpreted to exist at a particular location then the allowed pseudo-wells must also contain these features. FIG. 21 illustrates ten pseudo wells 266 which have been generated by the present invention, each pseudo well includes the channels 252, 254, 256, 258 and 260 which have been interpreted to exist at the spatial location represented by the pseudo well.

Figure 22:
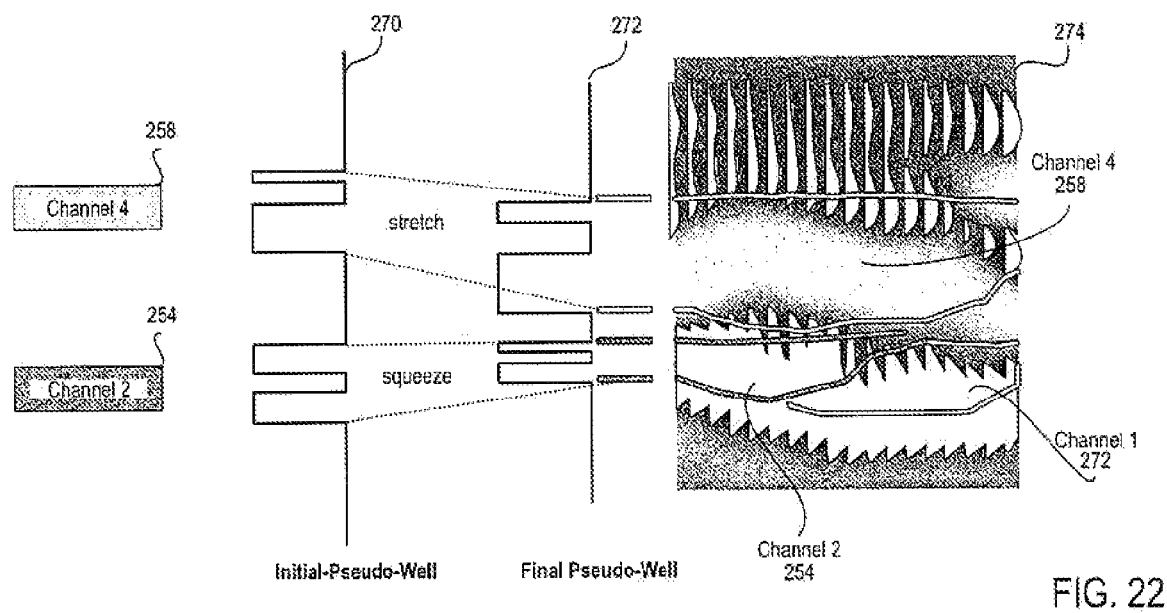
FIG. 22 illustrates dynamic stretching and squeezing to vertically match horizon mark pairs in one embodiment of the present invention.
Figure 23:
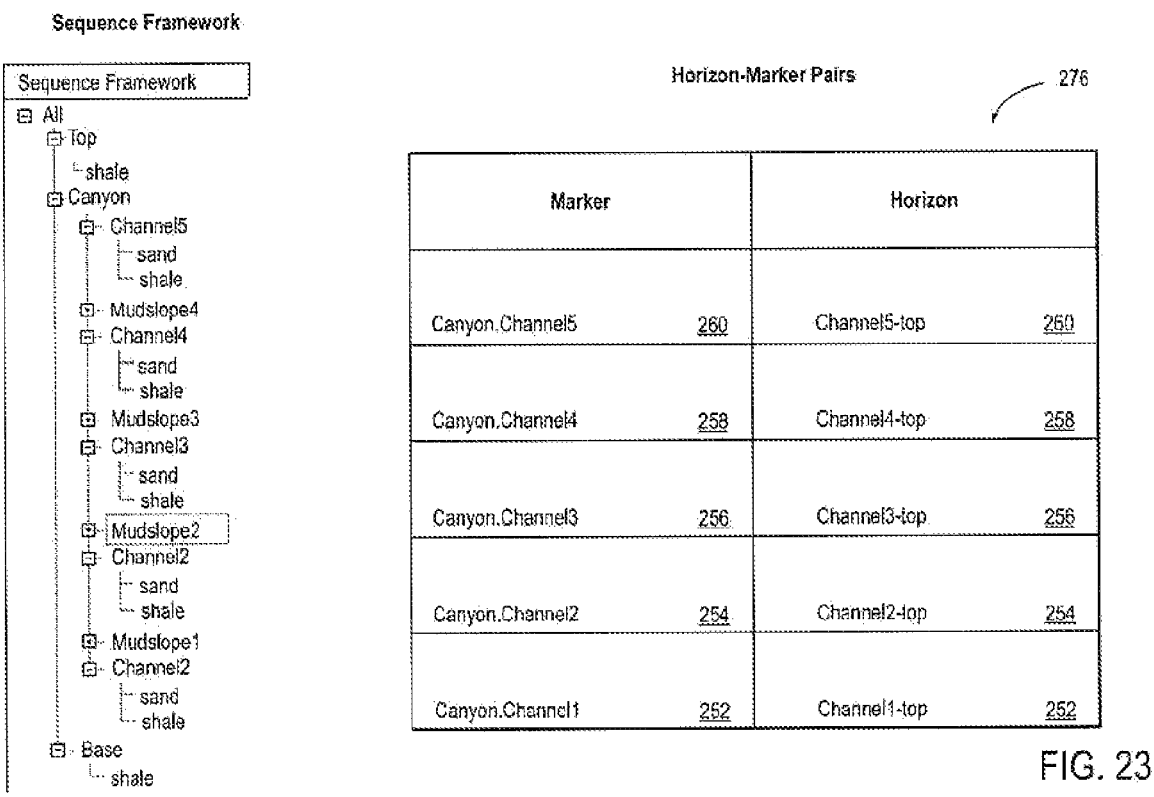
FIG. 23 illustrates an example of Horizon-Marker Pairs utilized by one embodiment of the present invention.

In addition to the existence constraint, seismic interpretation also provides information concerning the temporal position and time thickness of the interpreted geologic features. The dynamic nature of the generated pseudo-wells allows us to utilize this information by modifying the velocity and thickness of the particular stratigraphic units to dynamically stretch or squeeze the synthetic seismogram in order to improve the match to the actual real world seismogram at that particular location. FIG. 22 illustrates an initial synthetic column 270 generated by the present invention which includes channel four 258 and channel two 254. However, both channel four 258 and channel two 254 in the initial synthetic column 270 do not match the interpreted horizons or boundaries of the channels in the real world seismogram 274. The present invention dynamically stretches channel four 258 and moves it downwards on the synthetic seismogram 270 while dynamically squeezing channel two 254 and moves it upwards on foe synthetic seismogram 270 so that the synthetic seismogram 270 so that it matches the interpreted horizons 270. The result is a final synthetic seismogram 272 that more closely matches the interpreted real world seismogram 274. In order to be able to utilize this facility, the present invention establishes a link between the interpreted seismic horizons and the associated reference markers in the pseudo-stratigraphic columns. In one embodiment of the present invention, that link is provided by a user generated table of pre-determined marker-horizon pairs such as the table 276 illustrated in FIG. 23.

The result of this process is a volume where each seismic trace location is occupied by a set of log resolution labeled stratigraphic columns that satisfy all the available stratigraphic, rock physics and seismic constraints.

This volume can now be interrogated to provide various types of information about the reservoir interval under investigation. The range of possible outcomes at each trace location provides an estimate of the residual uncertainty still associated with the process after all available constraints have been utilized.

In order to generate an actual 3D reservoir model, selections need to made from within this volume for actual stratigraphic columns at each trace location. Since the pseudo stratigraphic columns are fully labeled it is possible to generate reservoir models with very specific characteristics. For example one could ask for a model in which a specific stratigraphic unit had maximum volume. This is simply a question of choosing the maximum thickness, for this unit, at each location. However, if the question was choosing the model in which a specific stratigraphic unit had maximum possible continuity then the solution is quite different. This type of constraint is very difficult to impose in other reservoir modeling methodologies. To generate this particular reservoir model, the problem requires a global optimization solution. The approach employed by the present invention for that particular embodiment is a combinatorial solution implemented by a genetic algorithm.

It is also possible to make realizations of 3D reservoir models based on a statistical approach. The problem that is presented there is different from the usual geostatistical application. In geostatistical simulation, one is trying to fill a volume that starts from being empty. In this case, the initial volume is full (many times over) and the problem is one of making choices between the pre-existing labeled stratigraphic columns at each trace location. One approach employed by the present invention is based on developing a 3D variogram from a 3D MPS training image. A random path is generated that visits each trace location in turn. At each location, the measure of correlation is calculated between the actual wells and each pseudo-well consistent with the 3D variogram. The pseudo-wells are retained with correlation similar to the variogram reference.

The pseudo-wells generated by the present invention can be used to estimate elastic geological properties such as Vp and Vs, porosity and density. The present invention further enables the transformation of the elastic geological properties to reservoir properties (e.g. permeability) via a process based on genetic programming and Fuzzy Neural Nets.

The present invention also allows for reservoir Net-to-Gross to be estimated by clustering low-frequency synthetic seismograms generated from the pseudo stratigraphic columns, and comparing the synthetic seismic data to real seismic data. Net-to-Gross is estimated by generating a number of pseudo-wells and computing Net-to-Gross for those pseudo-wells. A low-frequency band is then chosen, and a seismically interpreted horizon and a time window of interest are selected. Synthetic seismic traces with the particular low-frequency band are created from the pseudo-wells. The low frequency synthetic seismic traces are then clustered into similarity groups. Each of these groups is then represented by a prototype trace shape. This results in groups of pseudo stratigraphic columns being associated with each of these cluster prototypes. Further, the chosen low-frequency band is then applied to the real seismic data traces. The processed seismic data is then compared to the cluster prototype seismic traces. As a result, the pseudo stratigraphic column clusters are assigned to actual seismic data trace locations. Now, at each trace location, the clustered labeled synthetic stratigraphic can be interrogated to provide Net-to-Gross, distribution ranges and other related maps.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method of modeling a fully labeled synthetic stratigraphic column for populating a reservoir model, comprising the steps of:
   (a) assigning dynamically a plurality of stratigraphic units to the synthetic stratigraphic column based upon pre-selected geological patterns;
   (b) assigning dynamically elastic geological properties to each of the stratigraphic units in the synthetic stratigraphic column based upon pre-selected geological patterns;
   (c) sampling the synthetic stratigraphic column to provide elastic property logs;
   (d) converting the elastic property logs to a synthetic seismogram; and
   (e) matching dynamically the synthetic seismogram to a corresponding seismogram in a set of real seismograms to obtain coordinates for the synthetic stratigraphic column within the reservoir model.

2. The method of claim 1, wherein steps (a) to (e) are repeated to populate a plurality of stratigraphic columns within a reservoir model.

3. The method of claim 2, wherein for each one of the set of real seismograms there is a plurality of matching synthetic seismograms.

4. The method of claim 3, wherein a set of criteria generated by deterministic constraints based on genetic algorithm optimization is used to choose a synthetic seismogram from the plurality of matching synthetic seismograms.

5. The method of claim 1, wherein the plurality of stratigraphic units assigned to the synthetic stratigraphic column is restricted to geological units of interest.

6. The method of claim 1, wherein the elastic property logs are transformed to reservoir properties utilizing genetic programming and Fuzzy Neural Networks.

7. The method of claim 1, wherein stratigraphic deposition patterns are used for assigned lithology distributions within the stratigraphic units of the synthetic stratigraphic column.

8. The method of claim 1, wherein an index map is used to dynamically assign the appropriate pseudo-wells for the purpose of matching the synthetic seismogram to the corresponding seismogram in a set of real seismograms to obtain coordinates for the synthetic stratigraphic column within the reservoir model.

9. The method of claim 1, wherein Net-to-Gross is estimated by clustering low frequency synthetic seismograms from the synthetic stratigraphic columns, and comparing the synthetic seismograms to the set of real seismograms.

10. The method of claim 1, wherein the synthetic stratigraphic columns are used to calculate Probabilistic Amplitude versus Offset.

11. A system for generating a model of fully labeled synthetic stratigraphic column for populating a reservoir model comprising:
   a plurality of stratigraphic units that are dynamically assigned to the synthetic stratigraphic column based upon pre-selected geological patterns;
   a plurality of elastic geological properties that are dynamically assigned to each of the stratigraphic units in the synthetic stratigraphic column based upon pre-selected geological patterns;
   a synthetic seismogram that has been converted from a sampling of the plurality of elastic geological property logs from the synthetic stratigraphic column; and a set of real seismograms, wherein the synthetic seismogram has been matched dynamically to at least one of the set of real seismograms to obtain coordinates for the synthetic stratigraphic column within the reservoir model.

12. The system of claim 11, wherein the system generates a plurality of synthetic seismograms and matches the plurality of synthetic seismograms to all of the set of real seismograms to populate the reservoir model.

13. The system of claim 12, wherein the system generates a plurality of reservoir models, wherein each model is populated with a different plurality of synthetic seismograms.

14. A method of modeling a fully labeled synthetic stratigraphic column for populating a reservoir model, comprising the steps of:

(a) building a hierarchical stratigraphic framework;
(b) defining a lithology fining index table which describes relative textures;
(c) integrating real well data into the hierarchical stratigraphic framework;
(d) constructing stratigraphic rules to be used in building the synthetic stratigraphic column;
(e) defining lithology property rules with constraints; and
(f) generating the synthetic column incorporating the hierarchical stratigraphic framework, the stratigraphic rules and the lithology property rules, wherein geological units included in the synthetic column are dynamic.

* * * * *